United States Patent
Seamons (10) Patent No.: US 11,260,327 B2
(45) Date of Patent: Mar. 1, 2022

(54) FILTER ELEMENT HAVING INTERMITTENT COUPLING WITH HOUSING COVER

(71) Applicant: Baldwin Filters, Inc., Kearney, NE (US)

(72) Inventor: Tyler Seamons, Kearney, NE (US)

(73) Assignee: Baldwin Filters, Inc., Kearney, NE (US)

(*) Notice: Subject to any disclaimer, the term of this patent is extended or adjusted under 35 U.S.C. 154(b) by 96 days.

(21) Appl. No.: 16/576,062

(22) Filed: Sep. 19, 2019

(65) Prior Publication Data
US 2020/0086253 A1    Mar. 19, 2020

Related U.S. Application Data

(60) Provisional application No. 62/733,106, filed on Sep. 19, 2018.

(51) Int. Cl.
*B01D 29/13* (2006.01)
*B01D 35/30* (2006.01)

(52) U.S. Cl.
CPC .......... *B01D 35/306* (2013.01); *B01D 29/13* (2013.01); *B01D 2201/0415* (2013.01);
(Continued)

(58) Field of Classification Search
CPC .................. B01D 35/306; B01D 29/13; B01D 2201/0415; B01D 2201/12;
(Continued)

(56) References Cited

U.S. PATENT DOCUMENTS 5,336,406 A * 8/1994 Stanford .............. B01D 35/153
  210/235
D770,011 S * 10/2016 Nelson ......................... D23/209
(Continued)

FOREIGN PATENT DOCUMENTS

EP        2201993 A1    6/2010
WO    2014036252 A1    3/2014

OTHER PUBLICATIONS

International Search Report and Written Opinion for International Application No. PCT/US2019/051939 filed Sep. 19, 2019 dated Dec. 5, 2019; 12 pgs.
(Continued)

*Primary Examiner* — Waqaas Ali
(74) *Attorney, Agent, or Firm* — Alix, Yale & Ristas, LLP (57) ABSTRACT

A filter assembly has a threaded cover that mates with a complementary thread on the filter housing. Rotation of the housing cover in a first direction moves the cover axially away from the housing, and rotation of the housing cover in a second direction opposite the first direction moves the cover axially toward the housing. An intermittent coupling between a filter housing cover and a filter element applies intermittent axial forces to the filter element as the housing cover is rotated in the first direction to separate the filter element from the housing along with the cover. The intermittent coupling includes components on the inside of the filter cover that engage with complementary components on the filter element during each revolution of the cover.

17 Claims, 6 Drawing Sheets

(52) U.S. Cl.
CPC .... *B01D 2201/12* (2013.01); *B01D 2201/295* (2013.01); *B01D 2201/342* (2013.01); *B01D 2201/4092* (2013.01)

(58) Field of Classification Search
CPC ........ B01D 2201/295; B01D 2201/342; B01D 2201/4092; B01D 2201/4084; B01D 29/21; B01D 36/003; B01D 35/16; B01D 2201/291; B01D 2201/305; B01D 2201/34; B01D 2201/4015; B01D 35/147
See application file for complete search history.

(56) References Cited

U.S. PATENT DOCUMENTS

| | | | |
|---|---|---|---|
| 10,071,326 B2* | 9/2018 | Schmoll | B01D 35/306 |
| 2012/0199522 A1 | 8/2012 | Wiendorf | |
| 2016/0317955 A1* | 11/2016 | Jokschas | B01D 36/003 |

OTHER PUBLICATIONS

PCT International Preliminary Report on Patentability for International application No. PCT/US2019/051939 filed Sep. 19, 2019; dated Apr. 1, 2021; 9 pgs.

\* cited by examiner

FILTER ELEMENT HAVING INTERMITTENT COUPLING WITH HOUSING COVER

FIELD OF THE INVENTION

The present disclosure relates to a filter element for use in a filter enclosure. Particularly, a filter element having an intermittent coupling with a housing cover to facilitate removal of the filter.

BACKGROUND

In a typical filter assembly, a filter element is positioned within a housing that directs fluid through filter media supported by the filter element. To facilitate replacement of the filter element, a filter housing cover (or lid) is provided to gain access to the filter element. The filter housing and cover may have a threaded coupling, so that the cover is rotated in a first direction during closure of the housing and rotated in the opposite direction during opening of the housing. In some filter assemblies, the filter element and cover have a releasable coupling to ensure that the filter element is removed together with the cover while when the cover is unscrewed from the housing. As the threaded coupling between the filter housing and cover is unscrewed, rotation of the cover imparts rotational and axial forces on the filter element, drawing the filter element out of the filter housing. The filter element includes seals that mate with parts of the filter housing to direct fluid through the filter media and separate unfiltered fluid in a "dirty" area of the housing from filtered fluid in a "clean" area of the housing. The filter element may include features that close a drain passage, where removal of the filter element with the cover opens the drain passage and allows fluid to leave the housing prior to opening of the filter housing. A coupled relationship between the filter element and the cover can be helpful for separating the seals carried by the filter element from the drain in the filter housing. A coupled relationship between the filter element and the filter housing lid also aids in handling the replacement filter element during installation.

However, in some filter assemblies, a coupled relationship between the filter element and the cover may be undesirable during use of the filter assembly. Pressure fluctuations in the filter housing during use can cause the housing to flex and induce movement of a coupled filter element relative to stationary parts of the filter assembly. Such relative movement can produce wear on seals carried by the filter element, resulting in premature failure of the seals. In such filter assemblies, it may be desirable to de-couple the filter element from the cover during use of the filter assembly, but to have a coupled relationship between the filter element and cover while opening the filter housing. Further, when the filter element is continuously coupled to the cover during removal, the filter element rotates with the cover and may undesirably increase the rotational force that must be applied to the cover to overcome frictional engagement of seals on the filter element with fixed parts of the filter housing.

Therefore, there is a need in the art for a filter element that has an intermittent connection to a filter housing cover to facilitate removal of the filter element, but leaving the filter element separate from the cover during use. An intermittent connection may also reduce the force needed to unscrew the cover, because the filter element need not rotate with the cover.

SUMMARY

An intermittent coupling between a filter housing cover and a replacement filter element is disclosed. In a filter housing where the cover has a threaded connection to the fixed part of the filter housing, rotation of the housing cover relative to the fixed housing part to tighten the cover moves the cover toward the fixed housing part, and counter-rotation of the housing cover to loosen the cover moves the cover away from the fixed housing part. The housing cover includes a seal that mates with the fixed housing part to form a sealed filter enclosure when the cover is tightened onto the fixed housing part. According to aspects of the disclosure, the replacement filter element and cover each include components of an intermittent coupling that operates during rotation of the cover to loosen the cover from the fixed housing part. As the cover moves away from the fixed housing part, coupling segments on the cover engage with flange segments on the filter element during a portion of each revolution of the cover. When the coupling segments and flange segments are engaged, force is transmitted from the cover to the filter element to move the filter element away from the fixed housing part (in the same direction as the cover).

The intermittent coupling includes coupling segments on the cover and flange segments on the upper end cap of the filter element facing the cover. One of the coupling parts can be a ramp or angled structure, while the other coupling part may be straight (not angled). In the context of the present disclosure, the term "angled" is intended to describe a structure or surface that is not parallel to a plane perpendicular to the rotational axis of the housing cover. A "straight" coupling part is parallel to a plane perpendicular to the rotational axis of the cover. The ramp or angled structure includes a lifting surface arranged to convert rotational and axial movement of the coupling part on the cover into axial movement of the filter element away from an installed position along with the cover as the cover is loosened from the fixed housing part. The ramp or angled structure may be on either the filter element or the cover, and the straight structure may be on the other of the cover or filter element. Rotation of the cover results in relative movement between the two coupling parts, which are arranged so that part of the coupling acts on a surface of the ramp or angled structure, resulting in axial force on the filter element urging the filter element away from a seated position within the filter enclosure. Repeated, intermittent engagement of the coupling parts during loosening rotation of the cover raises the filter element along with the cover until the cover is separated from the fixed housing part and the filter element is released from a seated position. Movement of the filter element relative to the fixed housing part during removal is parallel to an axis of rotation of the housing cover, and the rate of movement is determined by the pitch and slope of the cover/housing thread and the slope and arcuate length of a lifting surface of the ramp or angled structure.

The coupling may include blocking elements that prevent engagement of the coupling parts during tightening (clockwise) rotation of the cover. Blocking elements may project from an outside surface of the upper end cap of the filter element and engage the coupling segments of the cover while the cover is pushing downward on the filter element during tightening of the cover. The blocking elements may be positioned between the coupling parts on the filter element. The blocking elements can be used to prevent engagement of the coupling parts during installation/tightening of the cover and during use of the filter assembly. In filter assemblies where engagement of the coupling parts during use of the filter assembly is not critical, the blocking elements may be omitted.

One embodiment of a filter assembly incorporating the disclosed intermittent coupling includes a fixed housing, a cover having a thread engaged with a complementary thread on the housing and a replaceable filter element. The filter element includes a ring of filter media circumscribing a longitudinal axis and extending axially between a first endcap and a second endcap. The filter element includes a plurality of flange segments axially extending from an outside surface of the first endcap opposite the filter media and facing the underside of the housing cover. The filter element may include a plurality of stops between the flange segments. The stops are separate from the plurality of flange segments. As the housing cover is unscrewed (rotated counter-clockwise), the coupling segments projecting radially inwardly from an inside surface of the cover intermittently engage with a lifting surface on the flange segments to move the filter element axially away from the filter housing along with the cover. The intermittent coupling moves the filter element axially to raise the filter element out of the filter housing along with the cover. In some embodiments, the filter element may include seal structures on the second end cap that close a drain passage in the filter housing. The seal structures may stick or bind after being in place for extended periods during use of the filter assembly. The staged, axial movement of the filter element during removal of the cover can break the frictional engagement of seals on the bottom end cap and open a drain passage at the bottom of the housing (if present), without requiring that the filter element rotate with the cover.

In one configuration of a filter element, a plurality of flange segments axially extend from an outside surface of the first endcap, each flange segment including an axially projecting wall and a flange projecting radially outward from said wall at a location axially spaced from the outside surface, the flange including a lifting surface facing the outside surface of the filter element. The plurality of flange segments may include two or more flange segments positioned a first radial distance from a longitudinal axis of the filter element, thereby defining a radial position of the lifting surfaces. In some embodiments, the axially projecting wall has a shape defined by a segment of a circle centered on the longitudinal axis of the filter assembly. In some embodiments, each of the plurality of flange segments subtend an acute angle and are equally spaced from each other on a circle centered on a longitudinal axis of the filter element. A longitudinal axis of the filter element may be coincident with a rotational axis of the cover.

In other embodiments, the axially projecting wall of each flange segment has a first end at a first height above the outside surface and a second end at a second height above the outside surface, the first height being greater than the second height, and the lifting surface being a planar surface extending from the first height to the second height. In other embodiments, a lifting surface on the flange segments is not parallel to the outside surface of the upper end cap.

In some embodiments, the first (upper) endcap of the filter element may define an opening centered on the longitudinal axis of the filter element and surrounded by a seal support. In other embodiments, the second (lower) endcap may include an axially projecting annular seal including at least one radially oriented seal component.

In some embodiments, the disclosed intermittent coupling may include at least one stop axially extending from the outside surface of the first end (upper) cap at a position between two of said plurality of flange segments. Each stop may include a stop face perpendicular to the outside surface of the first end cap. In some embodiments, the stop face of the at least one stop extends radially outward of a radial position of the lifting surface. In some embodiments, the stop projects axially from the outside surface to a third height, the third height being less than an axial height of any portion of the lifting surface.

One embodiment of a filter assembly incorporating the disclosed intermittent coupling includes a housing having an open upper end and a bottom end including a drain, the housing open end surrounded by a first thread. A cover includes a second thread configured to engage the first thread to secure the cover to the housing and define a filtration chamber. The cover includes a plurality of coupling segments radially projecting radially inwardly from an inside surface of the cover. The filter assembly includes a filter element with a first (upper) end cap, a second (lower) end cap and a ring of filter media extending between said first and second end caps and circumscribing a longitudinal axis of the filter element. The first and second end caps have outside surfaces facing axially away from the ring of filter media. The filter element is positioned within the filtration chamber and includes a drain seal projecting axially from the second end cap outside surface to close the drain when said cover is secured within the filtration chamber defined by the housing and cover. The first (upper) end cap of the filter element includes a plurality of flange segments axially extending from the outside surface of the first endcap.

In a filter assembly incorporating the disclosed intermittent coupling, rotation of the cover in a first direction brings the coupling segments on the cover into contact with the first end cap outside surface and the coupling segments apply an axial force on the filter element to engage the seal on the filter element with the drain in the filter housing. Rotation of the cover in a second direction opposite the first direction causes the coupling segments on the cover to engage with the flange segments on the filter element to impart an intermittent axial force on the filter element to disengage the drain seal from the drain so that fluid in the filtration chamber flows out of the drain before the first and second threads are disengaged. The cover includes a cover seal that remains compressed between the housing and the cover as the cover is rotated in the second direction until after the drain seal is disengaged from the drain. The drain may be annular, and the drain seal on the filter element may include an axially projecting annular seal including at least one radially oriented seal component.

In some embodiments, the first end cap includes at least one stop between two of the plurality of flange segments, the stop including a stop face projecting above the first end cap outside surface to prevent engagement of the coupling segments with the flange segments during rotation of the cover in the first (tightening) direction.

In some embodiments, the lifting surface on the flange segments is a planar surface oriented at a lifting angle relative to a longitudinal axis of the filter element.

The disclosure includes a method of removing a filter element from a filter housing having an open upper end and a bottom end including a drain, the housing open end surrounded by a first thread, and a cover including a second thread configured to engage the first thread to secure the cover to the housing and define a filtration chamber. The cover including a plurality of radially inwardly projecting coupling segments. The method includes providing a filter element including a first end cap, a second end cap and a ring of filter media circumscribing a longitudinal axis and extending between the first and second end caps, the first and second end caps having outside surfaces facing away from the ring of filter media. The filter element includes a drain seal projecting axially from the second end cap outside surface to close the drain when the cover is secured to the housing and a plurality of flange segments axially extending from the outside surface of the first endcap. Rotating the cover of the filter assembly in a direction to remove the cover from the housing causes the coupling segments to act on the flange segments to apply an intermittent axial force on the filter element in a direction disengaging the drain seal from the drain and moving the filter element in an axial direction with the cover.

DETAILED DESCRIPTION

Figure 1:
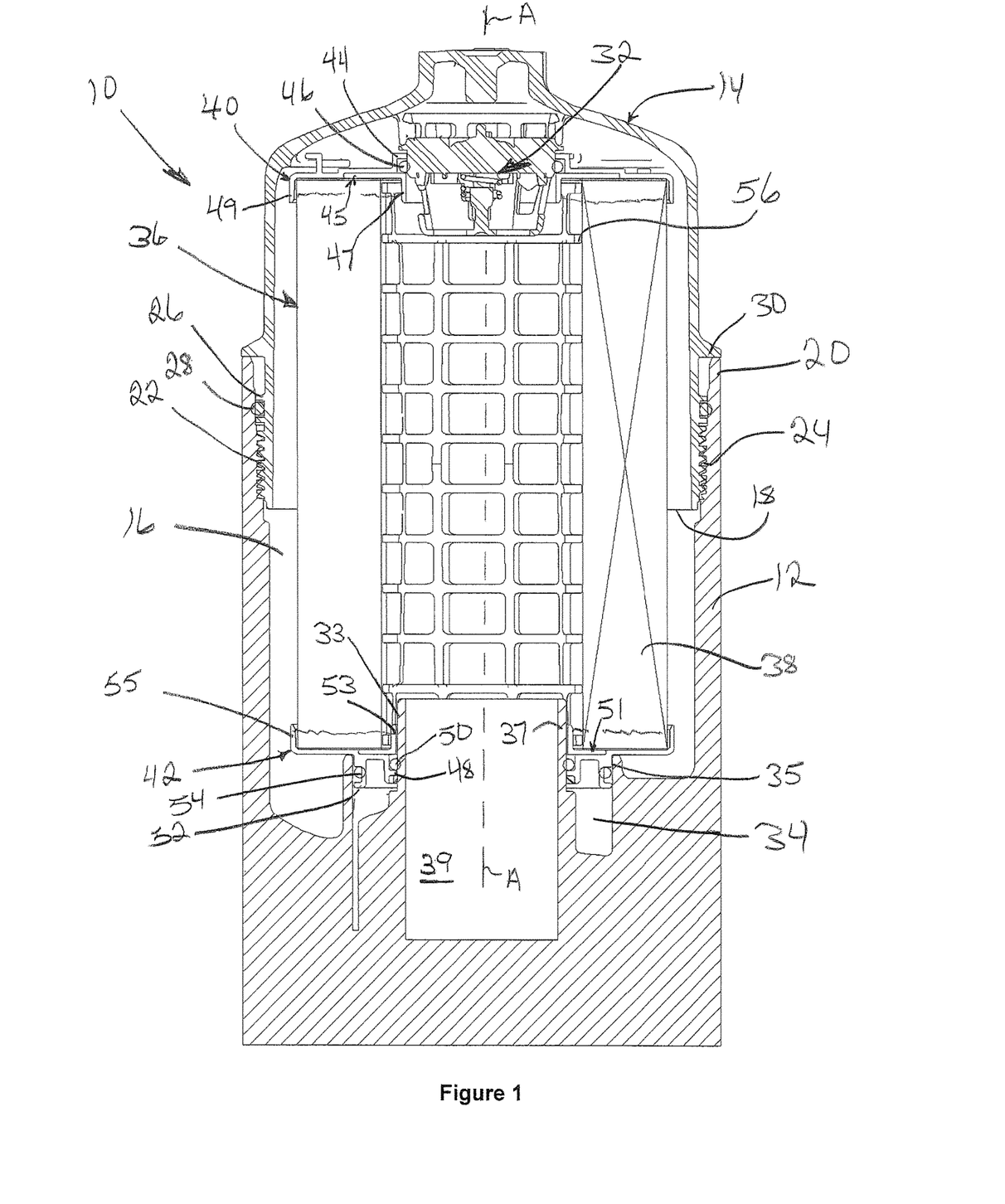
FIG. 1 is a sectional view of an exemplary embodiment of a filter assembly incorporating the disclosed intermittent coupling according to aspects of the disclosure.

An embodiment of a filter assembly 10 incorporating an embodiment of the disclosed intermittent coupling is shown in FIG. 1. The filter assembly 10 includes a filter housing 12 and a cover 14 that together define a filtration chamber 16. The filter housing 12 is mounted to equipment (not shown) and remains in a fixed position. The cover 14 includes an open end 18 that is received in an opening defined by the upper end 20 of the filter housing 12. The open end 18 of the cover 14 includes an outward facing male thread 22 complementary to an inward facing female thread 24 inside the upper end 20 of the filter housing 12. The threads 22, 24 are configured so that clockwise rotation of the cover 14 draws the cover toward the housing 12, and counter-clockwise rotation of the cover 14 moves the cover away from the housing 12. As is known to those skilled in the art, the threads 22, 24 have a pitch and helix angle with slope S that determines the extent of axial movement of the cover 14 relative to the housing 12 for each revolution of the cover 14 during tightening or loosening of the cover 14. The pitch and helix angle of the threads 22, 24 are factors that are used to determine the dimensions of the components of the disclosed intermittent coupling. The cover 14 includes a gland 26 that carries an O-ring seal 28. A radially projecting shoulder 30 on the cover 14 engages the upper end 20 of the filter housing 12 when the cover 14 is tightened onto the filter housing 12. When the cover 14 is tightened (as shown in FIG. 1), the seal 28 is radially compressed between the cover 14 and an inside surface of the housing 12. This sealed relationship between the cover 14 and the housing 12 contains fluid to be filtered within the filtration chamber 16 during use of the filter assembly 10. The cover 12 may incorporate a bypass valve assembly 32. In the filter assembly of FIG. 1, the housing 12 defines an annular drain channel 34 at the bottom of the filtration chamber 16.

A filter element 36 is received in the filtration chamber 16. The filter element 36 includes a ring of filter media 38 connected to an upper end cap 40 and a lower end cap 42. The ring of filter media 38 may be constructed of pleated non-woven filter media as is known in the art. The ring of filter media 38 is connected to the upper end cap 40 and lower end cap 42 by adhesive sealant or other means known in the art to produce a fluid-tight connection between the axial ends of the cylinder of filter media 38 and the end caps 40, 42. The ring of filter media 38 may be cylindrical and may be supported by a center tube 56. The upper end cap 40 includes a gland 44 that supports an O-ring seal 46 to mate with an outside surface of the bypass valve assembly 32 to prevent fluid from bypassing the cylinder of filter media 38 without flowing through the bypass valve assembly 32.

The upper end cap 40 includes an axially projecting annular wall 41 and a radially inward projecting shoulder 43 that define the outer and upper parts of the gland 44. The lower part of the gland 44 is defined by a radially oriented surface of an upper disk 45 received in a complementary pocket defined on the lower surface of the upper end cap 40. The upper disk 45 also includes an axially downward projecting inner rim 47 which, together with an outer rim 49 define a cradle which receives the upper end of the cylinder of filter media 38. The cradle provides a space for adhesive in liquid form to flow and cure to secure the filter media 38 to the upper end cap 40 as is known in the art. The upper disk 45 may be joined to the upper end cap 40 by adhesive, ultrasonic welding or other known attachment methods. The adhesive used to join the upper end cap 40 to the upper end of the filter media 38 spans and seals the joint between the upper disk 45 and the upper end cap 40. The upper disk 45 reduces the cost of molding the upper end cap 40 by eliminating the need for a movable core to form the gland 44 for O-ring seal 46. An upper end cap 40 molded as a single unitary part is also possible.

The lower end cap 42 includes a gland 48 supporting an inward facing O-ring seal 50 and a gland 52 supporting an outward facing O-ring seal 54. The upper part of gland 48 is defined by a radially oriented surface of a lower disk 51, which is received in a complementary pocket defined by the lower end cap 42. The lower disk 51 also includes an axially upward projecting inner rim 53 which, together with an outer rim 55 of the lower end cap 42 define a cradle that receives the lower end of the cylinder of filter media 38. The lower disk 51 may be joined to the lower end cap 42 by adhesive, ultrasonic welding or other known methods. The cradle defined between the inner rim 53 and the outer rim 55 provides a space for adhesive in liquid form to flow and cure to secure the lower end of the cylinder of filter media 38 to the lower end cap 42. The lower disk 51 reduces the cost of molding the lower end cap 42 by eliminating the need for a movable core to mold the gland 48. A lower end cap 42 molded as a single, unitary part is also possible.

The glands 48, 52 are supported on an annular structure projecting axially away from the bottom surface of the lower end cap 42, which positions the seals 50 and 54 inside of the annular drain channel 34 when the filter element 36 is fully installed as shown in FIG. 1. The seals 50 and 54 are radially compressed against the inner and outer surfaces 33, 35 of the annular drain channel 34 to close the drain channel 34 when the filter element 36 is installed. As shown in FIG. 1, the inside surface 33 of the drain 34 is on a tubular structure 37 surrounding a clean fluid outlet 39. The tubular structure 37 and inside surface 33 extend axially above the outside surface 35, so that seal 54 opens a drain path from the unfiltered region of the filtration chamber 16 outside the ring of filter media 38 before seal 50 disengages from inside surface 33. This arrangement prevents unfiltered fluid outside the filter media 38 from contaminating the clean fluid outlet 39 during exchange of a filter element 36.

The cylinder of filter media 38 is supported by a center tube 56 extending between the upper and lower end caps 40, 42. The center tube 56 is radially inward of and axially overlaps with the inner rim 47 of the upper end cap 40 and the inner rim 53 of the lower end cap 42. The upper and lower ends of the center tube are embedded in adhesive used to join the axial ends of the cylinder of filter media 38 to the upper and lower end caps 40, 42. The center tube 56 connects the upper and lower end caps 40, 42 so that forces applied to the upper end cap 40 during installation and removal of the filter element 36 are delivered to the lower end cap 42.

Figure 2:
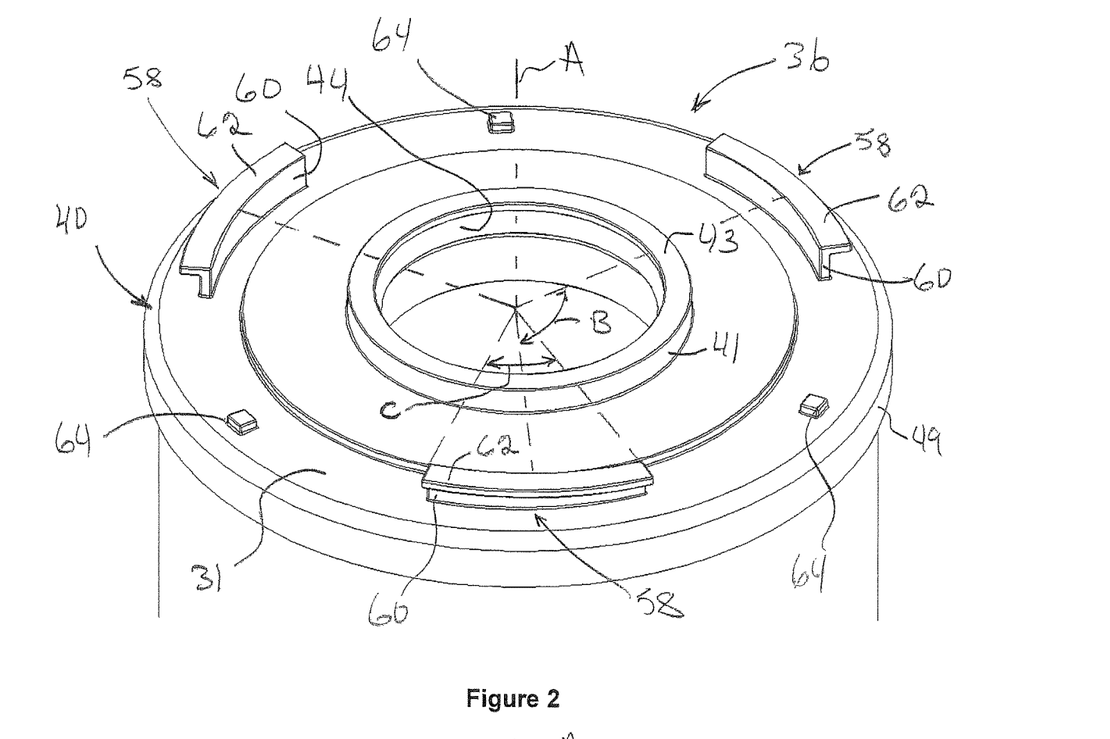
FIG. 2 is a top perspective view of a filter element incorporating ramped coupling parts according to aspects of the disclosure.

One example of an intermittent coupling according to aspects of the disclosure is illustrated in FIGS. 1-5, 7 and 8. As best seen in FIG. 2, the upper end cap 40 of the filter element 36 includes three identical, axially projecting flange segments 58. Each flange segment 58 includes an axially projecting arcuate wall 60 supporting an outwardly directed flange 62. The flange 62 is closer to the upper end cap 40 at one end than the other, so that the flange 62 defines an acute angle D relative to the outside surface 31 of the upper end cap 40. All of the flange segments 58 are arranged with the high side of the flange 62 facing in the same direction, and the arcuate walls 60 equidistant from a rotational axis A-A of the filter assembly 10. Each flange 62 defines a lifting surface 61 facing the outside surface 31 of the upper end cap 40. The lifting surface may be a planar surface. In the disclosed embodiment, the arcuate walls 60 are segments of a circle centered on the rotational axis A-A of the filter assembly 10. Optionally, at least one stop 64 is arranged between two of the flange segments 58, with FIG. 2 showing three stops 64. The flange segments 58 form one part of the disclosed intermittent coupling.

Figure 4:
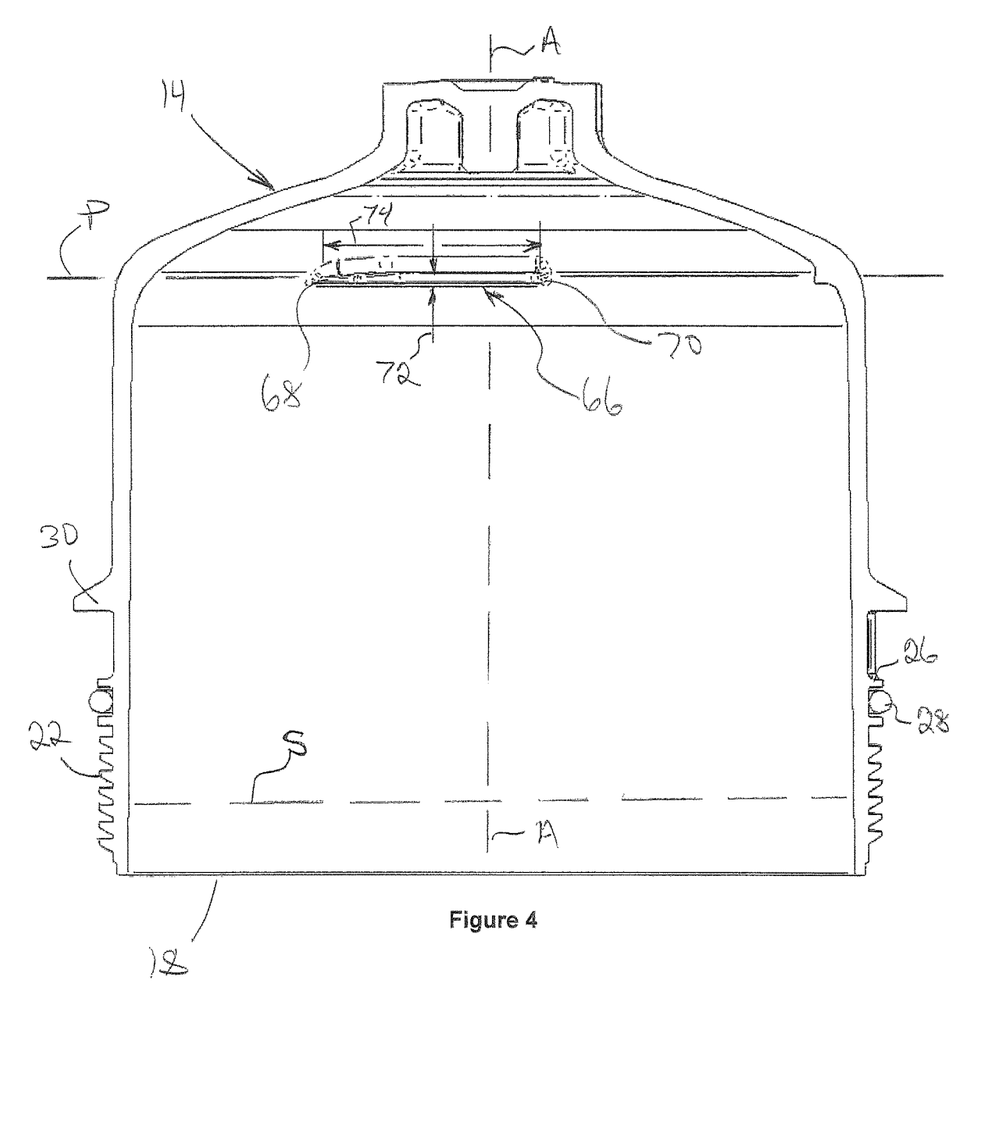
FIG. 4 is a sectional view through a filter housing cover incorporating a straight coupling part compatible with the ramped coupling parts shown in FIG. 2.
Figure 7:
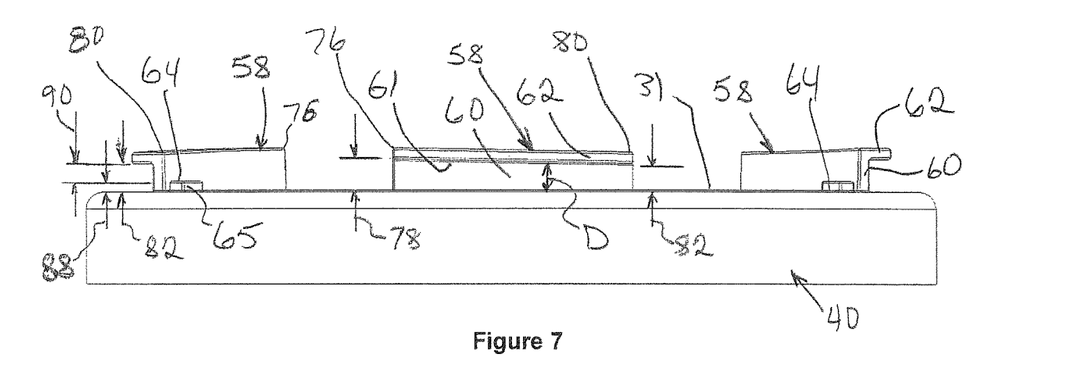
FIG. 7 is a side view of the upper end cap of the filter element of FIG. 2.
Figure 8:
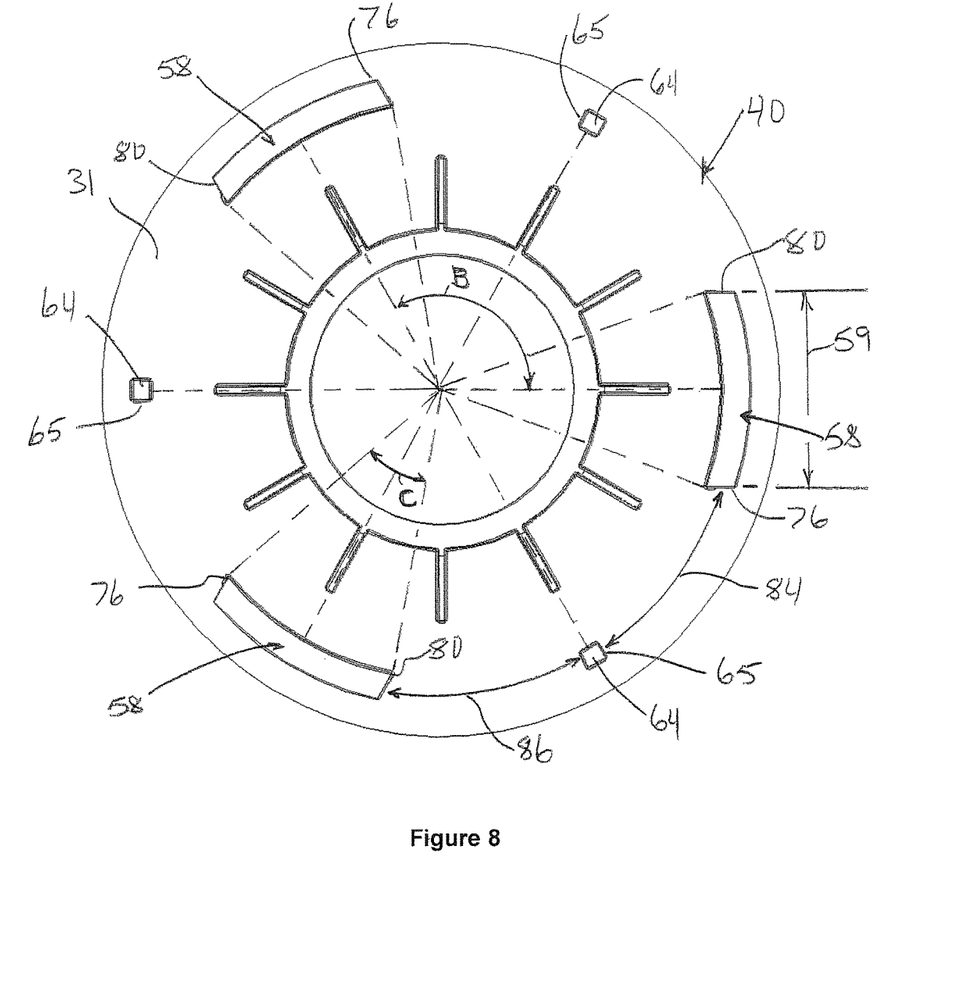
FIG. 8 is a top view of an upper end cap of a filter element according to aspects of the disclosure.

FIGS. 7 and 8 are side and top plan views of the upper end cap 40, showing the placement and configuration of the flange segments 58 and optional stops 64. Each flange segment 58 subtends an acute angle C and has an arcuate length 59 about a circle centered on rotational axis A-A. As best seen in FIG. 7, the arcuate wall 60 has a leading end 76 at a first height 78 above the outside surface 31 of the upper end cap 40, and a trailing end 80 at a second height 82 above the outside surface 31 of the upper end cap 40. The first height 78 is greater than the second height 82, resulting in a lifting surface 61 that defines an acute angle D relative to the outside surface 31 of the upper end cap 40. In the disclosed embodiment, angle D results in a lifting surface 61 that slopes up to the left in FIG. 7, and has a slope that is opposite a slope S of the cover/housing thread 22, 24, which slopes up to the right as best seen in FIG. 4. Alternatively, the lifting surface 61 may be sloped only at the leading end 76 of the flange segment 58 to ensure that the coupling segment 66 passes beneath the flange 62 to engage the lifting surface 61. After the sloped leading end, the remainder of the lifting surface can be parallel to the outside surface 31 of the upper end cap 40 and the arcuate length 59 of each flange segment 58 extended to achieve the same axial lift of the filter element 36 for a given rotation of the cover 14.

FIG. 4 is a sectional view of one example of a cover 14, with the bypass valve assembly 32 removed for clarity. The cover 14 includes three coupling segments 66 projecting radially inwardly from the closed upper end of the cover 14. The coupling segments 66 are identical to each other and are arranged equidistant from each other about the inside circumference of the cover 14, resulting in an angle of about 120° from the center of each coupling segment 66 to the center of the adjacent coupling segment 66. The three coupling segments 66 are arranged in a common horizontal plane P perpendicular to rotational axis A-A. The coupling segments 66 are horizontal and include a tapered leading edge 68 and a blunt trailing edge 70. The coupling segments 66 have a substantially constant axial thickness 72 and an arcuate length 74 measured about the circumference of the inside surface of the cover 14 in plane P. Although three coupling segments 66 are illustrated, two or more coupling segments can be used. The illustrated coupling segments 66 are identical to each other, but the disclosed intermittent coupling is not limited to identical coupling segments.

Figure 3:
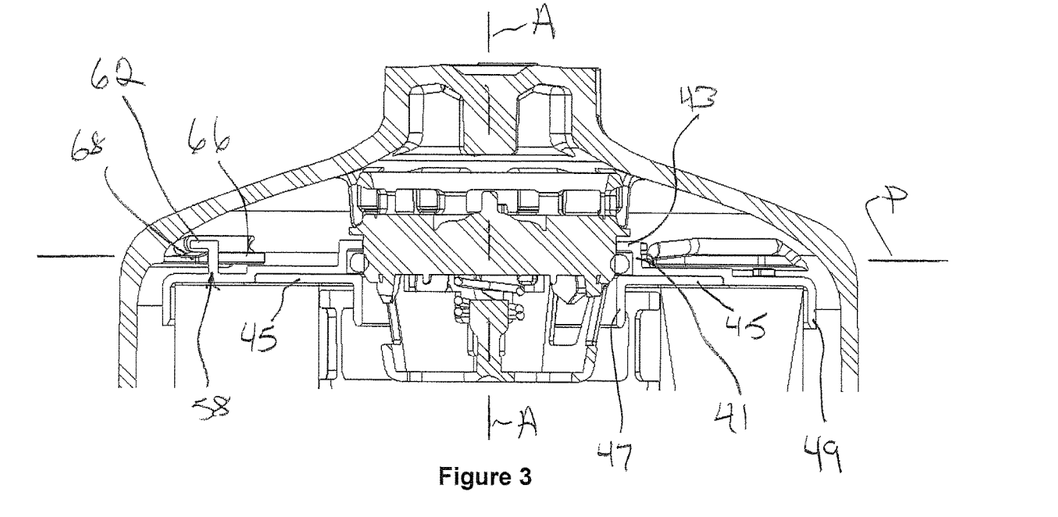
FIG. 3 is an enlarged partial sectional view of the filter cover and upper end of the filter element of the filter assembly of FIG. 1.

FIG. 1 shows a filter assembly 10 incorporating the disclosed intermittent coupling between the housing cover 14 and the filter element 36. In FIG. 1, the cover 14 is tightened against the filter housing 12, with the shoulder 30 of the cover 14 seated against the upper end 20 of the housing 12. The cover seal 28 is radially compressed between a gland 26 on the cover 14 and an inside surface of the housing 12 above the thread 24. When fully installed, the seals 50, 54 at the lower end of the filter element 36 are seated in the annular drain channel 34, resulting in frictional engagement between the filter element 36 and the filter housing 12. As the cover 14 is rotated counter clockwise to begin the process of removing the filter element 36, the cover 14 moves axially away from the housing 12 and filter element 36. The tapered leading edges 68 of the coupling segments 66 on the cover 14 enter the leading end 76 of the flange segments 58 as shown in FIG. 3. During removal of the cover 14, the coupling segments 66 are spaced apart from the top surface 31 of the upper end cap 40 of the filter element 36 far enough that the coupling segments 66 pass over the stops 64 (if present) and beneath the flanges 62 of the flange segments 58. The disclosed filter assembly 10 includes three equally spaced coupling segments 66 on the cover 14 and three equally spaced flange segments 58 on the filter element 36. In this configuration of an intermittent coupling, the three coupling segments 66 interact with the three flange segments 58 at the same time during counterclockwise rotation of the cover 14.

As the coupling segments 66 pass beneath the flanges 62, the coupling segment 66 contact the lifting surface 61 and the filter element 36 is axially raised within the filtration chamber 16 along with the cover 14. The slope S of cover/housing thread 22, 24 causes the coupling segments 66 to move in an upward spiral as the cover is rotated counter clockwise. The upward spiral movement of the coupling segments 66 and the oppositely sloped lifting surface 61 result in a pre-determined axial movement of the filter element 36 when the coupling segments 66 are in contact with the lifting surfaces 61. During each revolution of the cover 14, each of the three coupling segments 66 pass beneath each of the flange segments 58, resulting in an intermittent coupling between the cover 14 and the filter element 36. Intermittent engagement of the coupling segments 66 on the cover 14 with the flange segments 58 on the filter element 36 happens three times during each revolution of the cover 14. The position and configuration of the coupling segments 66 and the flange segments 58 are designed to ensure that the coupling segments 66 pass beneath the leading end 76 of each of the flange segments 58, raising the filter element 36 in small axial increments until the seals 50, 54 are separated from the annular drain channel 34. When the cover 14 is separated from the housing 14, the filter element 36 can be exchanged for a new filter element 36.

Figure 5:
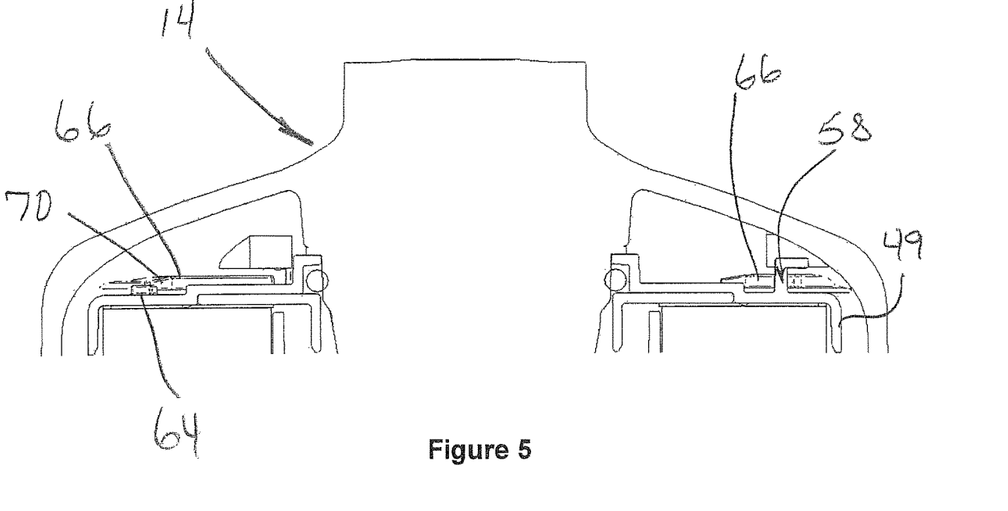
FIG. 5 is a sectional view of a filter housing cover incorporating an angled coupling part according to aspects of the disclosure.

The flange segments 58 of the filter element 36 interact with the coupling segments 66 of the cover 14 differently depending upon the direction of rotation of the cover 14. During rotation of the cover 14 in a clockwise direction to secure the cover 14 and install a new filter element 36, the coupling segments 66 are moving toward the housing 12 and are engaged with the outside surface 31 of the upper end cap 40. During clockwise rotation of the cover 14, the coupling segments 66 are blocked from passing beneath the flange segments 58 by a stop face 65 of stops 64 meeting the blunt trailing edges 70 of the coupling segments 66, as shown in FIG. 5. As the cover 14 moves axially toward the housing 12, the coupling segments engage the outside surface 31 of the upper end cap 40 and push the filter element 36 toward a seated position within the housing 12. The stops 64 are arranged in the arcuate path that will be traversed by the coupling segments 66 during tightening (clockwise rotation) of the cover 14. The stops 65 may extend radially inward and outward of the path of the coupling segments 66. As the coupling segments 66 move in an arcuate path along the outside surface 31 of the upper end cap 40, the blunt trailing edge 70 of the coupling segments 66 meet the stop face 65 of the stops 64, which prevent the coupling segments from passing beneath the flange segments 58. When the cover 14 is fully tightened, the filter element 36 is seated in the housing 12, with the seals 50, 54 received in the annular drain channel 34. The coupling segments maintain the filter element 36 in its seated position by bearing on the outside surface 31 of the upper end cap 40.

According to aspects of the disclosure, the stops 64 ensure that the coupling segments 66 are not engaged with the flange segments 58 during use of the filter assembly 10. According to the disclosure, "not engaged" means that no portion of the coupling segments is beneath the flange 62 of the flange segments 58 when the filter element 36 is in a seated position and the cover 14 is closed, as shown in FIG. 1. With reference to FIG. 8, the stops 64 are positioned to leave an arcuate distance 84 equal to or preferably greater than the arcuate length 74 of the coupling segments 66 between the stop 64 and the flange segment 58 counter-clockwise from the stop 64. It will be understood by those skilled in the art that the stops 64 may be moved clockwise along arc 86 toward the adjacent flange segment 58 and serve its function of preventing engagement of the coupling segment 66 with the flange segment 58. Thus, the position of the stops 64 illustrated in the disclosed filter assembly 10 is not the only possible position. The number and position of the stops 64 relative to the flange segments 58 can be altered, since only one stop is required to prevent engagement of the intermittent coupling. If engagement of the coupling segments 66 with the flange segments 58 during use of the filter is acceptable, then the stops 64 can be dispensed with.

As shown in FIG. 7, the height 82 of the lifting surface 61 at the trailing end 80 of the flange segments 58 must be sufficient to allow the coupling segments 66 to pass over the stops 64 (if present) during counter-clockwise rotation of the cover 14. The stops 64 have an axial height 88 above the outside surface 31 of the upper end cap 40, resulting in a gap 90 between the top of the stop 64 and the lifting surface 61 at the trailing end 80 of the flange segments 58. The gap 90 is greater than the axial thickness 72 of the coupling segments 66. According to aspects of the disclosure, the stops 64 prevent the coupling segments 66 from passing beneath the flange segments 58 during tightening of the cover 14, but permit the coupling segments 66 to pass beneath and interact with the flange segments 58 during loosening of the cover 14.

Figure 6:
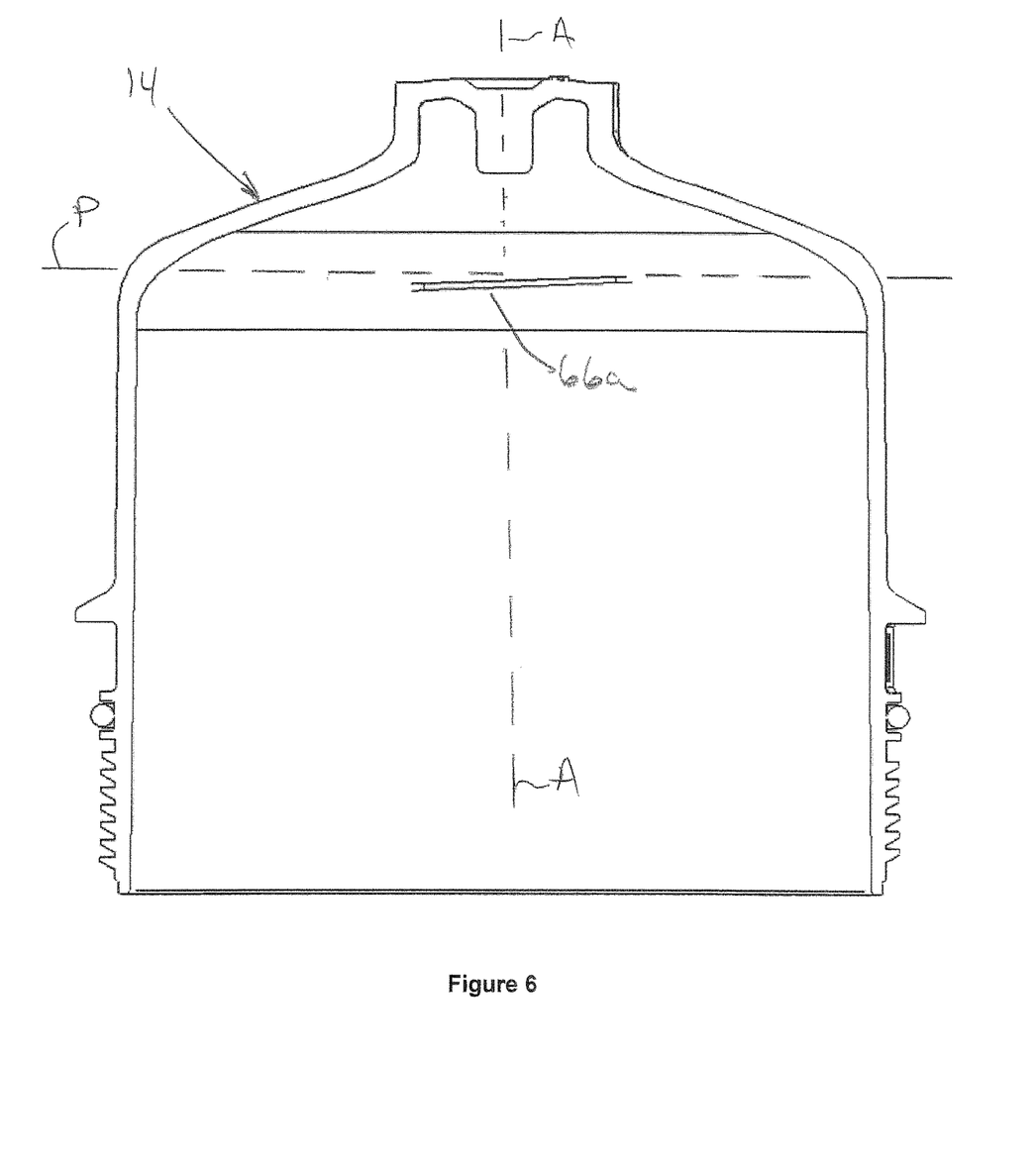
FIG. 6 is a partial sectional view of a filter housing cover and filter element showing interaction of a blocking element on the filter element with a coupling part on the filter housing cover according to aspects of the disclosure.

In an alternate embodiment, the flange segments 58 include a horizontal ramp (not shown) and the coupling segments 66a on the cover are angled as shown in FIG. 6. In this arrangement, it is the angle of the coupling segments 66a and the axial movement of the cover 14 away from the housing 12 that raise the filter element 36 when the cover 14 is rotated counter clockwise during removal of the filter element 36. The coupling segments on the cover could alternatively be shortened to resemble a peg projecting inward from the inside surface of the cover.

The disclosed intermittent coupling includes three coupling parts on the cover 14 and three coupling parts on the filter element 36. Other configurations employing more or fewer coupling parts are possible. In the disclosed intermittent coupling, three flange segments 58 extend over an arc C of approximately 60°-70°, with the result that the coupling segments 66 are engaged beneath the flange segments 58 for a total of approximately 180°-210° of every revolution of the cover 14. The arcuate extent and angle of the coupling parts are matched to the thread pitch of the filter assembly upon which the intermittent coupling will be used.

What is claimed:

1. A filter element for use in a housing of a filter assembly comprising: a ring of filter media circumscribing a longitudinal axis and extending axially between a first endcap and a second endcap, said first endcap including an outside surface facing away from the filter media; a plurality of flange segments axially extending from the outside surface of the first endcap, each flange segment including an axially projecting wall and a flange projecting radially outward from said wall at a location axially spaced from said outside surface, wherein said axially projecting wall has a first end at a first height above said outside surface and a second end at a second height above said outside surface, said first height being greater than said second height, wherein said flange includes a lifting surface, the lifting surface being a planar surface extending from said first height to said second height said flange including a lifting surface facing said outside surface and extending from said first height to said second height; and at least one stop axially extending from the outside surface of the first endcap at a position between two of said plurality of flange segments, each of the at least one stops including a stop face projecting axially from said outside surface to a third height, said third height being less than said second height.

2. The filter element of claim 1, wherein the stop face is perpendicular to said outside surface.

3. The filter element of claim 2, wherein said plurality of flange segments are positioned a first radial distance from said longitudinal axis, thereby defining a radial position of said lifting surfaces, the stop face of said at least one stop extending radially outward of said first radial distance.

4. The filter element of claim 1, wherein said axially projecting wall has a shape defined by a segment of a circle centered on said longitudinal axis.

5. The filter element of claim 1, said lifting surface being a planar surface extending from said first height to said second height.

6. The filter element of claim 1, wherein said lifting surface is not parallel to said outside surface.

7. The filter element of claim 1, wherein the first endcap further comprises an opening centered on said longitudinal axis and surrounded by a seal support.

8. The filter element of claim 1, wherein the second endcap includes an axially projecting annular seal including at least one radially oriented seal component.

9. The filter element of claim 1, wherein each of the plurality of flange segments subtend an acute angle and are equally spaced from each other on a circle centered on said longitudinal axis.

10. A filter assembly comprising:
   a housing having an open upper end and a bottom end including a drain, said housing open end surrounded by a first thread;
   a cover including a second thread configured to engage said first thread to secure the cover to the housing and define a filtration chamber, said cover including a plurality of radially inwardly projecting coupling segments;
   a filter element including a first endcap, a second endcap and a ring of filter media circumscribing a longitudinal axis and extending between said first and second endcaps, said first and second endcaps having outside surfaces facing away from said ring of filter media, said filter element positioned within said filtration chamber and including a drain seal projecting axially from said second endcap outside surface to close said drain when said cover is secured to said housing;
   a plurality of flange segments axially extending from the outside surface of the first endcap each flange segment including an axially projecting wall and a flange projecting radially outward from said wall at a location axially spaced from said outside surface, said flange including a lifting surface facing said outside surface; and
   wherein rotation of the cover in a first direction brings said coupling segments into contact with said first end cap outside surface and applies an axial force on said filter element to engage said seal with said drain, and rotation of the cover in a second direction causes said coupling segments to engage with said lifting surfaces for a portion of each rotation of the cover in said second direction to impart an intermittent axial force on the filter element to disengage said drain seal from said drain so that fluid in said filtration chamber flows out of said drain before said first and second threads are disengaged.

11. The filter assembly of claim 10, wherein said cover includes a cover seal that remains compressed between said housing and said cover as said cover is rotated in said second direction until after said drain seal is disengaged from said drain.

12. The filter assembly of claim 10, wherein said drain is annular, and said drain seal includes an axially projecting annular seal including at least one radially oriented seal component.

13. The filter assembly of claim 10, wherein said first end cap includes at least one stop between two of said plurality of flange segments, said stop including a stop face projecting above said first end cap outside surface to prevent engagement of said coupling segments with said flange segments during rotation of said cover in said first direction.

14. The filter assembly of claim 13, wherein said axially projecting wall has a first end at a first height above said outside surface and a second end at a second height above said outside surface, said first height being greater than said second height, said lifting surface being a planar surface extending from said first height to said second height.

15. The filter assembly of claim 13 wherein said lifting surface is a planar surface oriented at a lifting angle relative to said longitudinal axis.

16. The filter element of claim 1, wherein the height of the at least one stop leaves a gap between a top surface of the stop and the lifting surface at the second end of each flange segment.

17. The filter assembly of claim 13, wherein said at least one stop has an axial height that leaves a gap between a top surface of the stop and the lifting surface, said axial gap large enough to allow the coupling segments to pass over the at least one stop between intermittent engagement with the lifting surfaces when the cover is rotated in the second direction.

* * * * *